United States Patent [19]

Velasquez et al.

[11] Patent Number: 5,616,152
[45] Date of Patent: Apr. 1, 1997

[54] METHOD OF PREPARING ELECTRODES

[75] Inventors: David A. Velasquez, Fairfield, Calif.; Douglas B. Holmes, Lexington; E. Lawrence Gogolin, Sudbury, both of Mass.

[73] Assignee: Valence Technology, Inc., Henderson, Nev.

[21] Appl. No.: 631,715

[22] Filed: Apr. 10, 1996

[51] Int. Cl.⁶ .................................................. H01M 4/04
[52] U.S. Cl. .................................... 29/623.5; 29/2
[58] Field of Search ........................ 29/623.1, 623.5, 29/2; 427/126.1, 126.3; 141/1.1

[56] References Cited

U.S. PATENT DOCUMENTS

| | | | |
|---|---|---|---|
| 4,469,145 | 9/1984 | Fletcher et al. | 141/1.1 |
| 5,064,735 | 11/1991 | Rampel et al. | 29/623.5 X |
| 5,093,970 | 3/1992 | Senoo et al. | 29/2 |
| 5,154,993 | 10/1992 | Beatty | 29/2 |

*Primary Examiner*—Anthony Skapars
*Attorney, Agent, or Firm*—Charles Jew

[57] ABSTRACT

A method of fabricating electrodes suitable for use in electrochemical cells is provided. Each electrode has a perforated current collector and a tab which form an integral unit. The method can be adapted for batch, semi-continuous, or continuous fabrication of electrodes having electrode material laminated onto one or both surfaces of the current collector.

14 Claims, 2 Drawing Sheets

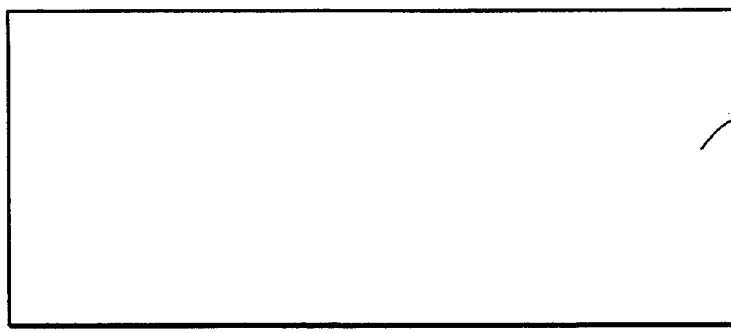
FIG._1A
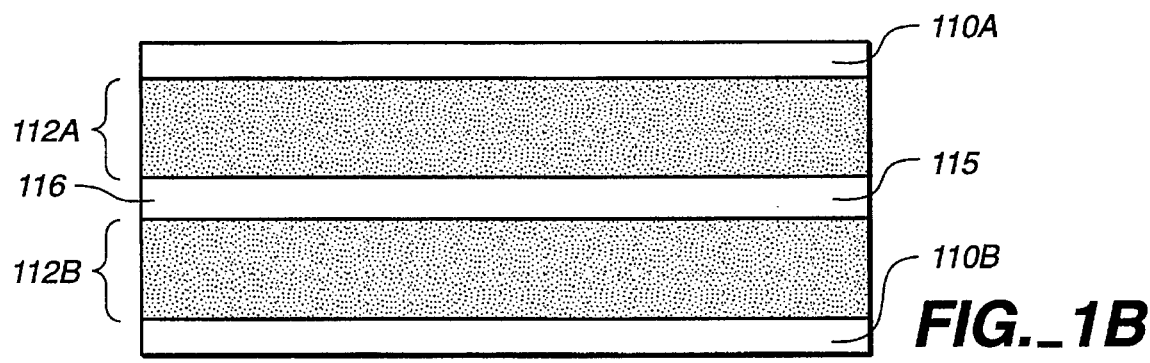
FIG._1B
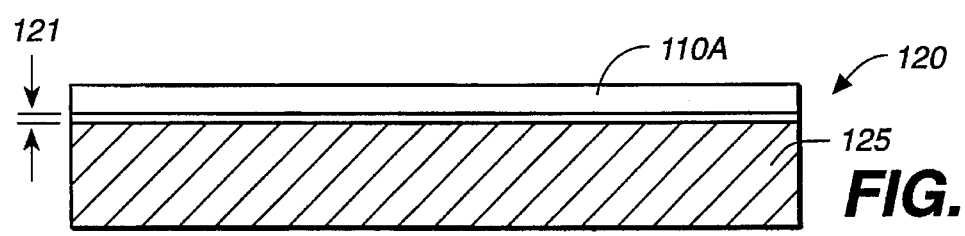
FIG._1C
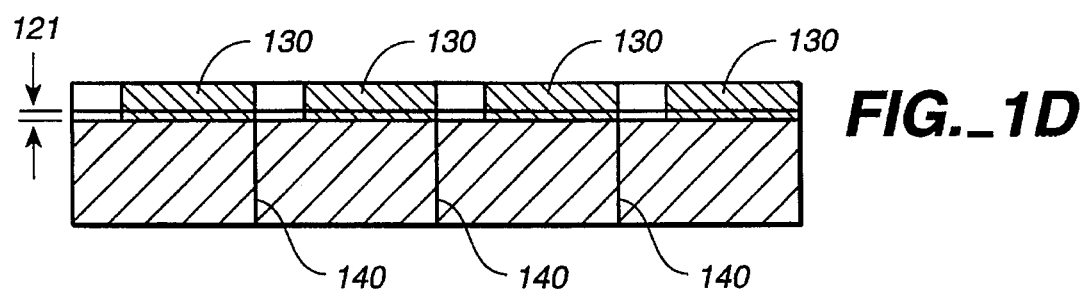
FIG._1D
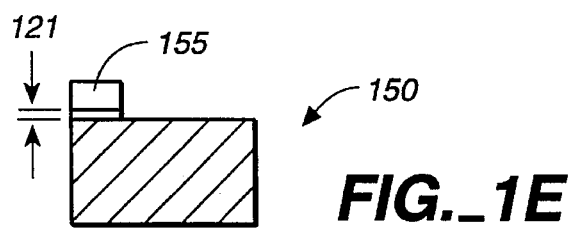
FIG._1E

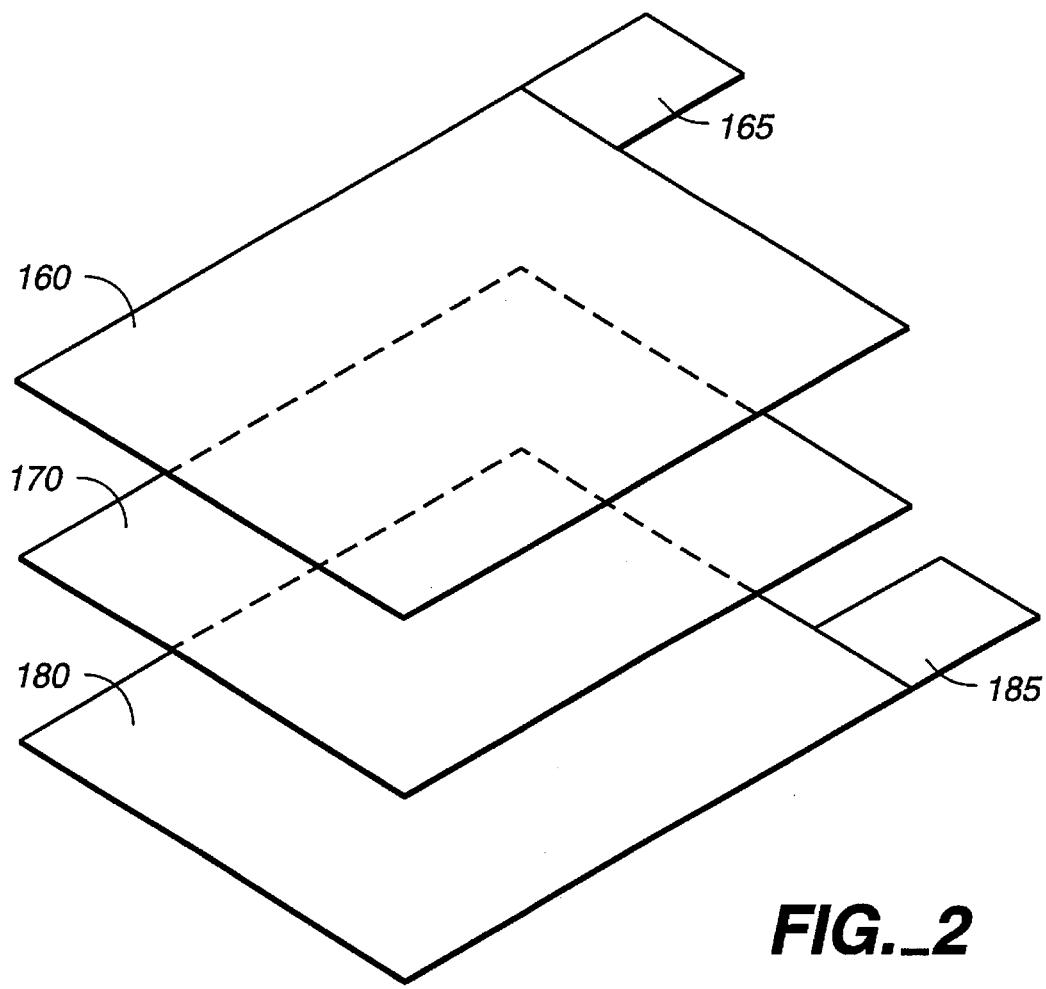
FIG._2
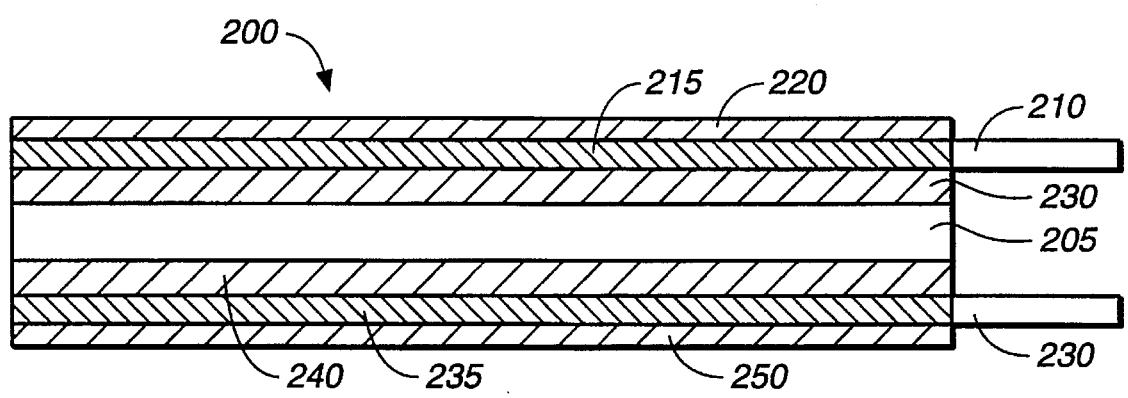
FIG._3

METHOD OF PREPARING ELECTRODES

FIELD OF THE INVENTION

The present invention relates to electrochemical devices and, more particularly, to a method of fabricating electrodes with current collectors for electrochemical cells.

BACKGROUND OF THE INVENTION

Non-aqueous lithium electrochemical cells typically include an anode, a lithium electrolyte prepared from a lithium salt dissolved in one or more organic solvents and a cathode of an electrochemically active material, typically a chalcogenide of a transition metal. During discharge, lithium ions from the anode pass through the liquid electrolyte to the electrochemically active material of the cathode where the ions are taken up with the simultaneous release of electrical energy. During charging, the flow of ions is reversed so that lithium ions pass from the electrochemically active cathode material through the electrolyte and are plated back onto the lithium anode.

Recently, the lithium metal anode has been replaced with a carbon anode such as coke or graphite intercalated with lithium ions to form $Li_xC$. In operation of the cell, lithium passes from the carbon through the electrolyte to the cathode where it is taken up just as in a cell with a metallic lithium anode. During recharge, the lithium is transferred back to the anode where it reintercalates into the carbon. Because no metallic lithium is present in the cell, melting of the anode does not occur even under abuse conditions. Also, because lithium is reincorporated into the anode by intercalation rather than by plating, dendritic and spongy lithium growth does not occur. Non-aqueous lithium electrochemical cells are discussed in U.S. Pat. Nos. 4,472,487, 4,668,595 and 5,028,500.

Current collectors are used with carbon anodes and cathodes as described, for example, in U.S. Pat. Nos. 4,925,752, 5,011,501 and 5,326,653. In fabricating cathodes for instance, a cathode material comprising solvent(s), polymer, and electrochemically active particulate material is laminated onto a current collector. Thereafter, the solvent(s) are allowed to evaporate to form a sheet of cathode material on the current collector. Unfortunately, prior art anode and cathode materials often do not adhere adequately to the surface of the current collector which reduces the performance of the electrochemical cell. Furthermore, prior art current collector tabs often do not provide adequate electrical contact between the current collector and the external load.

SUMMARY OF THE INVENTION

The present invention is directed to a method of fabricating electrodes wherein the electrode material is intimately attached to the current collector. In addition the electrode comprises a current collector tab which is an integral part of the current collector. The inventive process can be adapted for continuous fabrication.

In one aspect, the invention is directed to a method of fabricating electrodes suitable for use in electrochemical cells which comprises the steps of:

(a) providing an elongated metal sheet having two surfaces;

(b) perforating a portion of the metal sheet to form a partially perforated metal sheet having a solid, non-perforated border along its length;

(c) partially covering at least one surface of the partially perforated metal sheet with an electrode film;

(d) removing discrete sections from the solid, non-perforated border to form a plurality of electrode tabs; and (e) cutting the partially perforated metal sheet to form a plurality of electrodes each having an electrode tab.

In another aspect, the invention is directed to a method of fabricating electrodes suitable for use in electrochemical cells which comprises the steps of:

(a) providing an elongated metal sheet having two surfaces;

(b) perforating a portion of the metal sheet to form a partially perforated metal sheet having two solid, non-perforated borders along its length;

(c) partially covering at least one surface of the partially perforated metal sheet with an electrode film;

(d) cutting the partially perforated metal sheet along the length of its midsection to form two partially coated perforated metal sheets each having a solid, non-perforated border along its length; and (e) removing discrete sections from the solid, non-perforated border of each of the two partially coated metal sheets to form a plurality of electrode tabs; and (f) cutting each of the two partially coated perforated metal sheets to form a plurality of electrodes each having an electrode tab.

BRIEF DESCRIPTION OF THE DRAWINGS

FIG. 1A–1E illustrate the process of fabricating electrodes.

FIG. 2 is a schematic, perspective view of an electrochemical cell.

FIG. 3 is a schematic, cross-sectional view of an electrochemical cell.

DETAILED DESCRIPTION OF THE PREFERRED EMBODIMENTS OF THE INVENTION

The present invention is directed to a method of preparing electrodes suitable for use in electrochemical devices particularly electrochemical cells.

Preferred electrochemical cells include: a cathode comprising an active material, an intercalation based carbon anode, with each electrode capable of reversibly incorporating (e.g., intercalating) an alkali metal ion, and a polymeric matrix containing an electrolyte solution comprising, an organic electrolyte solvent and a salt of the alkali metal. Each electrode has a current collector. Particularly preferred electrochemical cells and batteries use lithium and salts thereof.

The anode of the present invention generally comprises an anode film that is laminated onto one or both sides of the current collector which is a thin metal foil or grid. Typically, each anode film is from about 100 µm to about 250 µm in thickness, preferably about 110 µm to about 200 µm, and more preferably about 125 µm to about 175 µm.

Similarly, the cathode of the present invention generally comprises a cathode film that is laminated onto one or both sides of the cathode current collector which is a thin metal foil or grid. Typically, each cathode film is from about 100 µm to about 200 µm in thickness, preferably about 130 µm to about 175 µm, and more preferably about 140 µm to about 165 µm.

The anode and cathode each also includes a current collector that comprises, for example, a screen, grid, expanded metal, woven or non-woven fabric or knitted wire formed from an electron conductive material such as metals or alloys. Particularly preferred current collectors comprise perforated metal foils or sheets. Preferably, the current collector has a thickness from about 25 µm to about 75 µm, preferably about 35 µm to about 65 µm, and more preferably about 45 µm to about 55 µm. In order to minimize the weight of the electrochemical cell, thin current collectors are preferred. It is expected that current collector having a thickness of about 12.5 µm can be employed. Each current collector is also connected to a current collector tab which extends from the edge of the current collector. The current collector tab is integral to the current collector. By integral is meant that the body of the current collector and tab form a unit, that is, they are not separate members that are attached (e.g., welded) together. In batteries comprising multiple electrochemical cells, the anode tabs are preferably welded together and connected to a nickel lead. The cathode tabs are similarly welded and connected to a lead. External loads can be electrically connected to the leads. Current collectors and tabs are described in U.S. Pat. Nos. 4,925,752, 5,011,501, and 5,326,653, which are incorporated herein.

However, prior to describing this invention in further detail, the following terms will be defined.

The term "plasticizer" refers to an organic solvent, with limited solubility of polymers, that facilitates the formation of porous polymeric structures. By "porous structure" is meant that upon extraction of the plasticizer the polymer remains as a porous mass. Suitable plasticizers have high boiling points typically from about 100° C. to about 350° C. A number of criteria are important in the choice of plasticizer including compatibility with the components of the electrochemical cell precursor, processability, low polymer solubility and extractability, liquid solvents, e.g., diethyl ether, or dense gases for example. Preferred plasticizers include, for example, dibutyl phthalate, dioctylphthalate, and acetates, glymes, and low molecular weight polymers.

In operation, the plasticizer is first well mixed with a polymer. Thereafter the plasticizer is removed by extraction and in the process the porous structure is formed. Preferably the weight ratio of plasticizer to polymer is from about 1 to about 50, more preferably about 10 to about 30, and most preferably about 20 to about 25.

The term "electrochemical cell precursor" or "electrolytic cell precursor" refers to the structure of the electrochemical cell prior to the addition of the inorganic salt and electrolyte solution. The precursor typically comprises (each in precursor form) an anode, a cathode, and polymeric matrix. The anode and/or cathode may each include a current collector. The polymeric matrix can function as a separator between the anode and cathode.

The term "activation" refers to the placement of an inorganic salt and electrolyte solvent into the porous portions of an electrochemical cell precursor. After activation, the electrochemical cell is charged by an external energy source prior to use.

The term "electrolytic cell" or "electrochemical cell" refers to a composite containing an anode, a cathode and polymeric layer comprising an electrolyte solution interposed therebetween.

The term "battery" refers to two or more electrochemical cells electrically interconnected in an appropriate series/parallel arrangement to provide the required operating voltage and current levels.

The term "solid polymeric matrix" refers to an electrolyte compatible material formed by polymerizing an inorganic or organic monomer (or partial polymer thereof) and which, when used in combination with the other components of the electrolyte, renders the electrolyte solid. Suitable solid polymeric matrices are well known in the art and include solid matrices formed from inorganic polymers, organic polymers or a mixture of organic polymers with inorganic non-polymeric materials. Preferably, the solid polymeric matrix is an organic matrix derived from a solid matrix forming monomer and from partial polymers of a solid matrix forming monomer. See, for example, U.S. Pat. No. 4,925,751, which is incorporated herein.

Alternatively, the solid polymeric matrix can be used in combination with a non-polymeric inorganic matrix. See, for example, U.S. Pat. No. 4,990,413, which is incorporated herein by reference in its entirety. Suitable non-polymeric inorganic materials for use in conjunction with the solid polymeric matrix include, by way of example, β-alumina, silver oxide, lithium iodide, and the like. Suitable inorganic monomers are also disclosed in U.S. Pat. Nos. 4,247,499, 4,388,385, 4,414,607, 4,394,280, 4,432,891, 4,539,276, and 4,557,985 each of which is incorporated herein by reference.

The term "a solid matrix forming monomer" refers to inorganic or organic materials which in monomeric form can be polymerized, preferably in the presence of an inorganic ion salt, and a solvent mixture of an organic carbonate and a glyme compound, to form solid matrices which are suitable for use as solid electrolytes in electrolytic cells. Suitable solid matrix forming monomers are well known in the art and the particular monomer employed is not critical. The solid matrix forming monomers may also comprise heteroatoms capable of forming donor acceptor bonds with inorganic cations (e.g., alkali ions).

Examples of suitable organic solid matrix forming monomers include, by way of example, propylene oxide, ethyleneimine, ethylene oxide, epichlorohydrin, acryloyl-derivatized polyalkylene oxides (as disclosed in U.S. Pat. No. 4,908,283), urethane acrylate, vinyl sulfonate polyalkylene oxides (as disclosed in U.S. Pat. No. 5,262,253, which patent is incorporated herein by reference in its entirety), and the like as well as mixtures thereof. Examples of suitable inorganic solid matrix forming monomers include, by way of example, phosphazenes and siloxanes. Phosphazene monomers and the resulting polyphosphazene solid matrix are disclosed by Abraham et al., Proc. Int. Power Sources Symp., 34th, pp. 81–83 (1990) and by Abraham et al., J. Electrochemical Society, Vol. 138, No. 4, pp. 921–927 (1991).

The term "a partial polymer of a solid matrix forming monomer" refers to solid matrix forming monomers which have been partially polymerized to form reactive oligomers. Partial polymerization may be conducted for the purpose of enhancing the viscosity of the monomer, decreasing the volatility of the monomer, and the like. Partial polymerization is generally permitted so long as the resulting partial polymer can be further polymerized, preferably in the presence of a solvent, such as, a mixture of organic carbonate(s) to form solid polymeric matrices which are suitable for use as solid electrolytes in electrolytic cells.

The term "cured" or "cured product" refers to the treatment of the solid matrix forming monomer or partial polymer thereof under polymerization conditions (including cross-linking) so as to form a solid polymeric matrix. Suitable polymerization conditions are well known in the art and include by way of example, heating the monomer, irradiating the monomer with UV light, electron beams, and the like. The resulting cured product preferably contains repeating units containing at least one heteroatom such as oxygen or nitrogen which is capable of forming donor acceptor bonds with inorganic cations (alkali ions). Examples of suitable cured products suitable for use in this invention are set forth in U.S. Pat. Nos. 4,830,939 and 4,990,413 which are incorporated herein by reference in their entirety.

The solid matrix forming monomer or partial polymer can be cured or further cured prior to or after addition of the salt, solvent and, optionally, a viscosifier. For example, a composition comprising requisite amounts of the monomer or partial polymer, salt, organic carbonate solvent and viscosifier can be applied to a substrate and then cured. Alternatively, the monomer or partial polymer can be first cured and then dissolved in a suitable volatile solvent. Requisite amounts of the salt, organic carbonate solvent and viscosifier can then be added. The mixture is then placed on a substrate and cured; removal of the volatile solvent would result in the formation of a solid electrolyte. In either case, the resulting solid electrolyte would be a homogeneous, single phase product which is maintained upon curing, and does not readily separate upon cooling to temperatures below room temperature.

Alternatively, the solid polymeric matrix can be formed by a casting process which does not require the use of monomers or prepolymers, that is, no curing is required. A preferred method employs a copolymer of polyvinylidenedifluoride and hexafluoropropylene dissolved in acetone or other suitable solvent(s). Upon casting the solution, the solvent is evaporated to form the solid polymeric matrix. The solution may be casted directly onto a current collector. Alternatively, the solution is cast onto a substrate, such as a carrier web, and after the solvent (e.g., acetone) is removed, an electrode film is formed thereon.

The term "salt" refers to any salt, for example, an inorganic salt, which is suitable for use in a non-aqueous electrolyte. Representative examples of suitable inorganic ion salts are alkali metal salts of less mobile anions of weak bases having a large anionic radius. Examples of such anions are $I^-$, $Br^-$, $SCN^-$, $ClO_4^-$, $BF_4^-$, $PF_6^-$, $AsF_6^-$, $CF_3COO^-$, $CF_3SO_3^-$, $N(SO_2CF_3)_2^-$, and the like. Specific examples of suitable inorganic ion salts include $LiClO_4$, $LiSCN$, $LiBF_4$, $LiAsF_6$, $LiCF_3SO_3$, $LiPF_6$, $(CF_3SO_2)_2NLi$, $(CF_3SO_2)_3CLi$, $NaSCN$, and the like. The inorganic ion salt preferably contains at least one cation selected from the group consisting of Li, Na, Cs, Rb, Ag, Cu, Mg and K.

The electrolyte typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The term "compatible electrolyte solvent" or "electrolytic solvent," or in the context of components of the non-aqueous electrolyte, just "solvent," is a low molecular weight organic solvent added to the electrolyte and/or the cathode composition, which may also serve the purpose of solvating the inorganic ion salt. The solvent is any compatible, relatively non-volatile, aprotic, relatively polar, solvent. Preferably, these materials have boiling points greater than about 85° C. to simplify manufacture and increase the shelf life of the electrolyte/battery. Typical examples of solvent are mixtures of such materials as dimethyl carbonate, diethyl carbonate, propylene carbonate, ethylene carbonate, methyl ethyl carbonate, gamma-butyrolactone, triglyme, tetraglyme, dimethylsulfoxide, dioxolane, sulfolane, and the like. When using propylene carbonate based electrolytes in an electrolytic cell with graphite anodes, a sequestering agent, such as a crown ether, is added in the electrolyte.

For electrochemical cells where (1) the cathode comprises lithiated cobalt oxides, lithiated manganese oxides, lithiated nickel oxides, $Li_xNi_{1-y}Co_yO_2$, where x is preferably about 1 and y is preferably 0.1–0.9, $LiNiVO_4$, or $LiCoVO_4$, and (2) the anode comprises carbon, the electrolytic solvent preferably comprises a mixture of ethylene carbonate and dimethyl carbonate. For electrochemical cells where the cathode comprises vanadium oxides, e.g., $V_6O_{13}$ and the anode is lithium, the electrolytic solvent preferably comprises a mixture of propylene carbonate and triglyme.

The term "organic carbonate" refers to hydrocarbyl carbonate compounds of no more than about 12 carbon atoms and which do not contain any hydroxyl groups. Preferably, the organic carbonate is an aliphatic carbonate and more preferably a cyclic aliphatic carbonate.

Suitable cyclic aliphatic carbonates for use in this invention include 1,3-dioxolan-2-one (ethylene carbonate); 4-methyl-1,3-dioxolan-2-one (propylene carbonate); 4,5-dimethyl-1,3-dioxolan-2-one; 4-ethyl-1,3-dioxolan-2-one; 4,4-dimethyl-1,3-dioxolan-2-one; 4-methyl-5-ethyl-1,3-dioxolan-2-one; 4,5-diethyl-1,3-dioxolan-2-one; 4,4-diethyl-1,3-dioxolan-2-one; 1,3-dioxan-2-one; 4,4-dimethyl-1,3-dioxan-2-one; 5,5-dimethy-1-1,3-dioxan-2-one; 5-methyl-1,3-dioxan-2-one; 4-methyl-1,3-dioxan-2-one; 5,5-diethyl-1,3-dioxan-2-one; 4,6-dimethy1,3-dioxan-2-one; 4,4,6-trimethyl-1,3-dioxan-2-one; and spiro (1,3-oxa-2-cyclohexanone-5',5',1',3'-oxa-2'-cyclohexanone).

Several of these cyclic aliphatic carbonates are commercially available such as propylene carbonate and ethylene carbonate. Alternatively, the cyclic aliphatic carbonates can be readily prepared by well known reactions. For example, reaction of phosgene with a suitable alkane-α,β-diol (dihydroxy alkanes having hydroxyl substituents on adjacent carbon atoms) or an alkane-α,γ-diol (dihydroxy alkanes having hydroxyl substituents on carbon atoms in a 1,3 relationship) yields an a cyclic aliphatic carbonate for use within the scope of this invention. See, for instance, U.S. Pat. No. 4,115,206, which is incorporated herein by reference in its entirety.

Likewise, the cyclic aliphatic carbonates useful for this invention may be prepared by transesterification of a suitable alkane-α,β-diol or an alkane-α,γ-diol with, e.g., diethyl carbonate under transesterification conditions. See, for instance, U.S. Pat. Nos. 4,384,115 and 4,423,205 which are incorporated herein by reference in their entirety. Additional suitable cyclic aliphatic carbonates are disclosed in U.S. Pat. No. 4,747,850 which is also incorporated herein by reference in its entirety.

The term "viscosifier" refers to a suitable viscosifier for solid electrolytes. Viscosifiers include conventional viscosifiers such as those known to one of ordinary skill in the art. Suitable viscosifiers include film forming agents well known in the art which include, by way of example, polyethylene oxide, polypropylene oxide, copolymers thereof, and the like, having a number average molecular weight of at least about 100,000, polyvinylpyrrolidone, carboxymethylcellulose, and the like. Preferably, the viscosifier is employed in an amount of about 1 to about 10 weight percent and more preferably at about 2.5 weight percent based on the total weight of the electrolyte composition.

The anode typically comprises a compatible anodic material which is any material which functions as an anode in a solid electrolytic cell. Such compatible anodic materials are well known in the art and include, by way of example, lithium, lithium alloys, such as alloys of lithium with aluminum, mercury, manganese, iron, zinc, intercalation based anodes such as those employing carbon, tungsten oxides, and the like. Preferred anodes include lithium intercalation anodes employing carbon materials such as graphite, cokes, mesocarbons, and the like. Such carbon intercalation based anodes typically include a polymeric binder and extractable plasticizer suitable for forming a bound porous composite having a molecular weight of from about 1,000 to 5,000,000. Examples of suitable polymeric binders include EPDM (ethylene propylene diamine termonomer), PVDF (polyvinylidene difluoride), EAA (ethylene acrylic acid copolymer), EVA (ethylene vinyl acetate copolymer), EAA/EVA copolymers, and the like. The anode may also include an electron conducting material such as carbon black.

The cathode typically comprises a compatible cathodic material (i.e., insertion compounds) which is any material which functions as a positive pole in a solid electrolytic cell. Such compatible cathodic materials are well known in the art and include, by way of example, transition metal oxides, sulfides, and selenides, including lithiated compounds thereof. Representative materials include cobalt oxides, manganese oxides, molybdenum oxides, vanadium oxides, sulfides of titanium, molybdenum and niobium, the various chromium oxides, copper oxides, lithiated cobalt oxides, e.g., $LiCoO_2$ and $LiCoVO_4$, lithiated manganese oxides, e.g., $LiMn_2O_4$, lithiated nickel oxides, e.g., $LiNiO_2$ and $LiNiVO_4$, and mixtures thereof. Cathode-active material blends of $Li_xMn_2O_4$ (spinel) is described in U.S. Pat. 5,429,890 which is incorporated herein. The blends can include $Li_xMn_2O_4$ (spinel) and at least one lithiated metal oxide selected from $Li_xNiO_2$ and $Li_xCoO_2$ wherein $0<x\leq2$. Blends can also include $Li_y$-$\alpha$-$MnO_2$ ($0\leq y<1$) which is $Li_yNH_4Mn_8O_{16}$ ($0\leq y<1$) which has a hollandite-type structure. $Li_y$-$\alpha$-$MnO_2$ where $0\leq y<0.5$ is preferred. $\alpha MnO_2$ can be synthesized by precipitation from a reaction between a $MnSO_4$ solution and $(NH_4)_2S_2O_8$ as an oxidizing agent.

Lithiation (also referred to as "prelithiation") of $\alpha MnO_2$ can be accomplished via a solid state reaction:

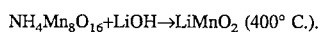

$NH_4Mn_8O_{16}+LiOH \rightarrow LiMnO_2$ (400° C.).

Li-$\alpha$-$MnO_2$ retains the same structure as Hollandite. See, Botkovitz et. al., J. of Power Sources, 43–44 (1993) 657–665, which is incorporated herein, for a discussion of the structure and electrochemical characteristics of Li-$\alpha$-$MnO_2$. $Li_y$-$\alpha$-$MnO_2$ $0\leq y<0.5$ is commercially available from SEDEMA, Tertre, Belgium.

In one preferred embodiment, the compatible cathodic material is mixed with an electroconductive material including, by way of example, graphite, powdered carbon, powdered nickel, metal particles, conductive polymers (i.e., characterized by a conjugated network of double bonds like polypyrrole and polyacetylene), and the like, and a polymeric binder to form under pressure a positive cathodic plate. Suitable binders for use in the cathode have a molecular weight of from about 1,000 to 5,000,000.

In one preferred embodiment, the cathode is prepared from a cathode paste which comprises from about 35 to 65 weight percent of a compatible cathodic material; from about 1 to 20 weight percent of an electroconductive agent; from about 1 to 20 weight percent of suitable polymeric binders that may include EPDM (ethylene propylene diene termonomer), PVDF (polyvinylidene difluoride), EAA (ethylene acrylic acid copolymer), EVA (ethylene vinyl acetate copolymer), EAA/EVA copolymers, and the like; from about 0 to about 20 weight percent of polyethylene oxide having a number average molecular weight of at least 100,000; from about 10 to 50 weight percent of solvent comprising a 10:1 to 1:4 (w/w) mixture of an organic carbonate and a glyme; and from about 5 weight percent to about 25 weight percent of a sold matrix forming monomer or partial polymer thereof. Also included is an ion conducting amount of an inorganic ion salt. Generally, the amount of the salt is from about 1 to about 25 weight percent. (All weight percents are based on the total weight of the cathode.)

The electrolyte composition typically comprises from about 5 to about 25 weight percent of the inorganic ion salt based on the total weight of the electrolyte; preferably, from about 10 to 20 weight percent; and even more preferably from about 10 to about 15 weight percent. The percentage of salt depends on the type of salt and electrolytic solvent employed.

The electrolyte composition typically comprises from 0 to about 80 weight percent electrolyte solvent (e.g., organic carbonate/glyme mixture) based on the total weight of the electrolyte; preferably from about 60 to about 80 weight percent; and even more preferably about 70 weight percent.

The electrolyte composition typically comprises from about 5 to about 30 weight percent of the solid polymeric matrix based on the total weight of the electrolyte; preferably from about 15 to about 25 weight percent.

In a preferred embodiment, the electrolyte composition further comprises a small amount of a film forming agent. Suitable film forming agents are well known in the art and include, by way of example, polyethylene oxide, polypropylene oxide, copolymers thereof, and the like, having a numbered average molecular weight of at least about 100,000. Preferably, the film forming agent is employed in an amount of about 1 to about 10 weight percent and more preferably at about 2.5 weight percent based on the total weight of the electrolyte composition.

Methodology

Electrochemical cells are known in the art. See, for example, U.S. Pat. Nos. 5,300,373, 5,316,556, 5,346,385, 5,262,253, 4,472,487, 4,668,595, and 5,028,500, all of which are incorporated herein. The inventive method can be adapted to form anode and cathode structures in prior art electrochemical cells.

Example 1 describes the procedure for fabricating electrodes. Examples 2 and 3 describe the process of preparing the anode and cathode slurries, respectively. Example 4 describes the procedures for fabricating a solid electrolytic cell.

The invention will be described using the anode and cathode structures wherein films (i.e., electrode materials) are laminated on both surfaces of the current collectors, however, it is understood that the invention is applicable to other configurations, for instance, where only one surface of the anode and/or cathode current collector is laminated.

EXAMPLE 1

Electrodes (i.e., anodes and cathodes) of the present invention are manufactured by the process as shown in FIGS. 1A–1E. A thin, elongated metal sheet or foil 100 from which the current collectors and tabs are fabricated is partially perforated to form perforated regions 112A and 112B. As is apparent, solid, non-perforated regions 110A and 110B along the length of the sheet remains. As shown in FIG. 1B, the sheet also has a middle region 115 representing a narrow strip that is also not perforated, however, this region can be perforated if desired.

Next, one or both sides (or surfaces) of the metal sheet is partially coated with an electrode film (i.e., anode or cathode film). On the side that is coated, the electrode film covers region 115 and most or all of regions 112A and 112B. Thereafter, the metal sheet is cut in half along its length at its midsection 116 to form two substantially identical coated halves. One of these partially coated, perforated foil 120 halves is shown in FIG. 1C. (Alternatively, the metal sheet 100 can be cut into halves before coating the electrode film onto each half to form two coated, perforated foils 120.) The electrode film does not have to coat the entire perforated region of coated, perforated foil 120. As shown in FIG. 1C, between coated section 125 and the and non-perforated region 110A is a narrow strip 121 comprising perforated foil that is not coated.

The partially coated, perforated foil is then cut to remove discrete sections designated 130 therefrom. Finally, the coated, perforated foil 120 is cut along pattern 140 that is transverse to the length of the foil to form a plurality of electrodes each having structure 150 as shown in FIG. 1E. The electrode includes a current collector tab 155 which is suitable for welding.

In the above process, the electrode film is preferably prepared by casting an anode slurry or a cathode slurry directly onto the perforated foil and allowing the solvent to evaporate. (Anode and cathode slurries are described below.) Alternatively, the anode or cathode film can be prepared by casting a slurry onto a substrate such as a carrier web and allowing the solvent to evaporate to form an electrode film. The electrode film is then removed from the substrate, cut to the appropriate size, and laminated onto one or both sides of the perforated foil. Moderate heat and pressure may be applied to facilitate lamination.

The inventive process can be adapted for batch, semi-continuous, or continuous fabrication of electrodes. For example, electrodes can be manufactured continuously by employing a roll of partially coated, perforated foil and continuously dispensing the foil as a web. The process as illustrated in FIGS. 1A–1E can be employed to fabricate the electrodes from the web.

Perforation of the metal sheet is particularly suited when both sides of the sheet (which later serves as the current collector) are laminated with the electrode film. The holes created allow the electrode film on both sides to come into contact so that the electrode film on one side adheres to electrode film on the other. The number of perforations or openings should be sufficient to allow good adherence of the electrode films. This results in a thinner electrochemical cell and better electrical contact to the current collector. However, the number and the size of the perforations should not be so high as to reduce the surface area of the current collector that is in contact with the electrode films to a level which raises the impedance to unacceptable levels.

Preferably, the size of each perforation ranges from about 0.80 mm to about 1.09 mm, more preferably from about 0.9 mm to about 1.0 mm, and most preferably about 0.95 mm in diameter. The number of perforations preferably ranges from about 46 to about 62, more preferably about 51 to about 57, and most preferably about 54 per $cm^2$. Generally, the number of perforations per area selected is inversely proportional to the size of the perforations. The perforations can be punched in the metal sheet in any suitable pattern. In one preferred pattern the holes are arranged in staggered rows so that the the distance (in the x axis) from the perimeter of one hole to that of an adjacent hole is about 0.45 mm and the distance (in the y axis) from the perimeter of said hole to that of an adjacent hole is about 1.51 mm.

For each electrode, the current collector and tab form an integral unit. This provides better structural integrity and electrical contact as compared to electrodes wherein the current collector and tab represent separate members that are simply placed in physical contact or are attached to each other.

Illustrated in FIG. 2 is an electrochemical cell comprising anode 160 and cathode 180, both fabricated by the above process, and polymeric layer 170 disposed between the anode and cathode. In this configuration, the anode tab 165 and cathode tab 185 are positioned side-by-side. As further illustrated in FIG. 3, electrochemical cell 200 is formed when the anode, cathode, and polymeric layer are fused together. In this embodiment, the anode comprises current collector 215 having anode films 220 and 230 coated on the upper and lower surfaces, respectively, of the current collector. In addition, tab 210 protrudes from the current collector. Similarly, the cathode comprises current collector 235 having cathode films 240 and 250 coated on the upper and lower surfaces, respectively, of the current collector. Likewise, tab 230 protrudes from the current collector. Polymeric layer 205 contains the electrolyte solution comprising an electrolyte solvent and in organic salt. A plurality of electrochemical cells can be stacked to form a battery wherein all the anode tabs are welded together and electrically connected to an anode lead (e.g., nickel) and all the cathode tabs are welded together and electrically connected to a cathode lead. The leads are connected to an external load when the battery is in use.

EXAMPLE 2

The anode slurry was prepared as follows:

A polymer mixture comprising a copolymer of polyvinylidenedifluoride (PVDF) and hexafluoropropylene (HFP) was prepared by mixing 6.8 grams of the copolymer in 20 grams of acetone. The copolymer (ave. MW 125K) was Kynar Flex 2801™ from Elf Atochem North America, in Philadelphia, Pa. The mixture was stirred for about 24 hours in a milling jar available from VWR Scientific, in San Francisco, Calif., model H-04172-00. The copolymer functions as a binder for the carbon in the anode.

A graphite mixture was prepared separately by first adding 23.4 grams of graphite into 0.9 grams of carbon black into a solution containing 60 grams acetone, 10.5 grams dibutyl phthalate, and 0.5 grams of a surfactant. A preferred graphite comprises a 50:50 (by weight) mixture of a synthetic graphite available under the designation SFG-15™ from Lonza G & T, Ltd. (Sins, Switzerland) and graphitized mesocarbon microbeads available under the designation MCMB25-28™ from Osaka Gas Co., Japan. A preferred carbon black is available under the designation Super P™ from M.M.M. Carbon, Willebroek, Belgium. Preferred surfactants include Pluronic FC68™ from BASF, Mt. Olive, N.J. and Flurad 430™ from 3M Co. St. Paul, Minn. The surfactant disperses the graphite. The graphite mixture was then vigorously mixed in a high shear mixer until a substantially homogeneous blend was formed. A suitable mixer is available from Ross Model ME100DLX, Hauppauge, N.Y., operating at its highest setting (about 10,000 RPM) for 30 minutes.

The anode slurry was prepared by mixing the polymer mixture and the graphite mixture together under low shear conditions to form the anode slurry wherein the components are well mixed. A portion of the acetone is allowed to evaporate from the slurry before it was laminated onto the metal sheet of Example 1. Anode films form when the remaining portion of the acetone evaporates.

EXAMPLE 3

The cathode slurry was prepared as follows:

A polymer mixture comprising a copolymer of polyvinylidenedifluoride (PVDF) and hexafluoropropylene (HFP) was prepared by mixing 4.4 grams of the copolymer in 15 ml of acetone. The copolymer was Kynar Flex 2801™. The mixture was stirred for about 24 hours in a milling jar.

A cathode mixture was prepared separately by first adding 28.9 grams of a cathode-active material blend comprising $Li_xMn_2O_4$ (spinel) ($0 \leq x < 2$) and $Li_y$-$\alpha$-$MnO_2$ ($0 \leq y < 1$) (1:1 weight ratio), 2.4 grams of carbon black (Super P™) into a solution containing 60 grams acetone, 8.7 grams dibutyl phthalate, and 0.5 grams of a surfactant. The mixture was then vigorously mixed in the a high shear mixer until a substantially homogeneous blend was formed.

The cathode slurry was prepared by mixing the polymer mixture and the graphite mixture together under low shear conditions to form the anode slurry wherein the components are well mixed. A portion of the acetone is allowed to evaporate from the slurry before it was laminated onto the metal sheet of Example 1. Cathode films form when the remaining portion of the acetone evaporates.

The above anode and cathode films were formed directly on the current collector by laminating the slurry mixtures onto the current collector surfaces. Alternatively, each film can be prepared by first casting a slurry onto a substrate or carrier web and allowing the solvent to evaporate thus leaving the film. Thereafter, the films can be laminated onto each side of the metal sheet.

EXAMPLE 4

A solid electrochemical cell is prepared by first positioning a polymeric matrix between the anode and cathode and thereafter fusing the structures under moderate pressure and temperature (e.g., 130° C.) to form an electrochemical cell precursor. The pressure and temperature will depend on the polymer(s) forming the polymer matrix. The polymeric matrix is formed by casting a polymeric slurry comprising acetone, dibutyl phthalate, silanized fumed $SiO_2$, and the PVDF/HFP copolymer on a suitable substrate or carrier web and allowing the acetone to evaporate. No curing by radiation is required. The $SiO_2$ is a filler which impart toughness and strength to the film. In addition, it is believed that the $SiO_2$ assists the activation process by creating physicochemical conditions such that the electrolyte solution quickly and completely fills the pores created by the extraction of the dibutyl phthalate. Preferably, the polymeric slurry is mixed under low shear conditions as not to degrade the copoloymer.

Preferably in preparing the polymer mixture for both the anode and cathode slurries is that the polymer (or copolymer) not be subject to high shear so as to be degraded. Furthermore, preferably the polymer or copolymer employed has a high average molecular weight. Preferably the average molecular weight is between 50K to 750K, more preferably 50K to 200K, and most preferably 50K to 120K. Furthermore, it is preferred that polymer or copolymer has a narrow molecular weight have range. Preferably $M_n \approx 1.0/M_w$.

Next the dibutyl phthalate plasticizer is extracted from the precursor. Extraction can be accomplished using conventional organic liquid solvents such as diethyl ether or by supercritical fluids which includes, for example, a gas compressed and heated to either supercritical or subcritical conditions to achieve liquid-like densities. Supercritical fluids are known in the art. See, for example, U.S. Pat. Nos. 5,013,366, 5,267,455, 4,219,333, 4,012,194, and 3,969,196, which are incorporated herein. A preferred supercritical fluid is carbon dioxide. The precursor is than pre-packaged in moisture-impermeable material which is described, for example, in U.S. Pat. No. 5,326,653 which is incorporated herein, before being activated. Activation preferably occurs in an inert (e.g., argon) atmosphere. Finally, the packaging of the electrochemical cell is sealed.

While the invention has been described in terms of various preferred embodiments, the skilled artisan will appreciate the various modifications, substitutions, and changes which may be made without departing from the spirit hereof. The descriptions of the subject matter in this disclosure are illustrative of the invention and are not intended to be construed as limitations upon the scope of the invention.

What is claimed is:

1. A method of fabricating electrodes suitable for use in electrochemical cells which comprises the steps of:
    (a) providing an elongated metal sheet having two surfaces;
    (b) perforating a portion of the metal sheet to form a partially perforated metal sheet having a solid, non-perforated border along its length;
    (c) partially covering at least one surface of the partially perforated metal sheet with an electrode film;
    (d) removing discrete sections from the solid, non-perforated border to form a plurality of electrode tabs; and
    (e) cutting the partially perforated metal sheet to form a plurality of electrodes each having an electrode tab.

2. The method of claim 1 wherein the step (c) comprises the steps of casting an electrode slurry onto at least one surface of the partially perforated metal sheet and allowing solvent to evaporate from the electrode slurry.

3. The method of claim 1 wherein the step (c) comprises partially covering both surfaces of the partially perforated metal sheet with an electrode film.

4. The method of claim 1 wherein step (e) comprises cutting the partially perforated metal sheet in a direction that is transverse to the length of the partially perforated metal sheet.

5. The method of claim 1 wherein step (a) comprises providing a metal sheet having a thickness of about 25 μm to about 75 μm and that is fabricated of a metal selected from aluminum, copper, nickel, and alloys thereof.

6. The method of claim 1 wherein step (c) comprises partially covering both surfaces of the partially perforated metal sheet with an anode film.

7. The method of claim 1 wherein step (c) comprises partially covering both surfaces of the partially perforated metal sheet with a cathode film.

8. A method of fabricating electrodes suitable for use in electrochemical cells which comprises the steps of:
    (a) providing an elongated metal sheet having two surfaces;
    (b) perforating a portion of the metal sheet to form a partially perforated metal sheet having two solid, non-perforated borders along its length;
    (c) partially covering at least one surface of the partially perforated metal sheet with an electrode film;

(d) cutting the partially perforated metal sheet along the length of its midsection to form two partially coated perforated metal sheets each having a solid, non-perforated border along its length; and (e) removing discrete sections from the solid, non-perforated border of each of the two partially coated metal sheets to form a plurality of electrode tabs; and (f) cutting each of the two partially coated perforated metal sheets to form a plurality of electrodes each having an electrode tab.

9. The method of claim 8 wherein the step (c) comprises the steps of casting an electrode slurry onto at least one surface of the partially perforated metal sheet and allowing solvent to evaporate from the electrode slurry.

10. The method of claim 8 wherein the step (c) comprises partially covering both surfaces of the partially perforated metal sheet with an electrode film.

11. The method of claim 8 wherein step (f) comprises cutting each of the partially perforated metal sheets in a direction that is transverse to the length of the partially perforated metal sheet.

12. The method of claim 8 wherein step (a) comprises providing a metal sheet having a thickness of about 25 μm to about 75 μm and that is fabricated of a metal selected from aluminum, copper, nickel, and alloys thereof.

13. The method of claim 9 wherein step (c) comprises partially covering both surfaces of the partially perforated metal sheet with an anode film.

14. The method of claim 9 wherein step (c) comprises partially covering both surfaces of the partially perforated metal sheet with a cathode film.

* * * * *